US012615100B2

(12) United States Patent
Han et al.

(10) Patent No.: US 12,615,100 B2
(45) Date of Patent: Apr. 28, 2026

(54) TIME SLOT ALLOCATION PROCESSING METHOD, DEVICE AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Liuyan Han, Beijing (CN); Han Li, Beijing (CN); Dechao Zhang, Beijing (CN)

(73) Assignees: CHINA MOBILE COMMUNICATION CO., LTD RESEARCH INSITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 332 days.

(21) Appl. No.: 18/548,886

(22) PCT Filed: Mar. 3, 2022

(86) PCT No.: PCT/CN2022/079019
§ 371 (c)(1),
(2) Date: Sep. 1, 2023

(87) PCT Pub. No.: WO2022/184129
PCT Pub. Date: Sep. 9, 2022

(65) Prior Publication Data
US 2024/0146433 A1     May 2, 2024

(30) Foreign Application Priority Data
Mar. 3, 2021    (CN) ........................ 202110235233.X

(51) Int. Cl.
*H04J 3/16* (2006.01)
*H04W 72/0446* (2023.01)

(52) U.S. Cl.
CPC ....... *H04J 3/1658* (2013.01); *H04W 72/0446* (2013.01); *H04J 2203/0091* (2013.01)

(58) Field of Classification Search
CPC ....... H04J 2203/0085; H04J 2203/0091; H04J 3/1658; H04L 43/0852; H04W 72/0446
(Continued)

(56) References Cited

U.S. PATENT DOCUMENTS

RE47,545 E      7/2019  Grenier
10,594,423 B1 *  3/2020  Anand ................... H04J 3/0664
(Continued)

FOREIGN PATENT DOCUMENTS

CN      103686983 A      3/2014
CN      103748851 A      4/2014
(Continued)

OTHER PUBLICATIONS

3GPP TSG-RAN WG2 Meeting #112 electronic R2-2009023, Elbonia, Nov. 2-13, 2020, Agenda item: 8.11.2, Source: Intel Corporation, Title: Solution directions to reduce end-to-end latency, Document for: Discussion and decision. the whole document. 12 pages.
(Continued)

*Primary Examiner* — Robert J Lopata
(74) *Attorney, Agent, or Firm* — Syncoda LLC; Feng Ma

(57) ABSTRACT

A time slot allocation processing method includes: a node device determining a time delay, in the node device, from a certain input port time slot to another port time slot, wherein the node device is a node device on an end-to-end channel; and the node device determining that the time delay is used for the establishment of end-to-end channel time slot allocation. A time delay sent by each node device is received,
(Continued)

End-to-end channel

Processing within a node

Position of an input slot    Crossover    Position of an output slot and end-to-end channel time slot allocation is performed according to each time delay. By using the present application, a time delay caused by time slot allocation can be reduced in a channel, thereby decreasing an end-to-end channel time delay.

16 Claims, 4 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 2004/0105391 A1* | 6/2004 | Charcranoon | ...... | H04L 43/0829 370/252 |
| 2006/0239301 A1 | 10/2006 | Drange | | |
| 2008/0075121 A1* | 3/2008 | Fourcand | .............. | H04J 3/0682 370/503 |
| 2008/0075128 A1* | 3/2008 | Fourcand | .............. | H04J 3/0602 370/520 |
| 2010/0260131 A1* | 10/2010 | Ghanadan | ........... | H04W 72/535 370/329 |
| 2012/0327789 A1 | 12/2012 | Grenier | | |
| 2016/0170439 A1* | 6/2016 | Aweya | .................... | H04L 69/28 713/401 |
| 2017/0006362 A1 | 1/2017 | Shang | | |
| 2019/0033815 A1 | 1/2019 | Mantovani | | |
| 2019/0149898 A1 | 5/2019 | Shang | | |
| 2019/0320445 A1* | 10/2019 | Panigrahi | ............ | H04W 72/542 |
| 2019/0335405 A1* | 10/2019 | Wang | ................ | H04L 25/03019 |
| 2022/0104062 A1* | 3/2022 | Aijaz | ................ | H04W 28/0268 |
| 2022/0294711 A1* | 9/2022 | Rangarajan | ............. | H04L 47/32 |
| 2022/0294712 A1* | 9/2022 | Rangarajan | ............. | H04L 69/22 |
| 2022/0303202 A1* | 9/2022 | Hong | .................. | H04L 67/1004 |
| 2023/0020589 A1* | 1/2023 | Yang | ................. | H04W 72/0446 |
| 2023/0269063 A1* | 8/2023 | Dror | ..................... | H04J 3/0685 370/503 |
| 2024/0048502 A1* | 2/2024 | Zhu | ........................ | H04L 47/568 |

FOREIGN PATENT DOCUMENTS

| | | | |
|---|---|---|---|
| CN | 104796212 | A | 7/2015 |
| CN | 108292132 | A | 7/2018 |
| CN | 108886497 | A | 11/2018 |
| CN | 111970759 | A | 11/2020 |
| CN | 108495338 | B | 1/2021 |
| WO | 2017219148 | A1 | 12/2017 |

OTHER PUBLICATIONS

International Search Report in the international application No. PCT/CN2022/079019, mailed on Jun. 1, 2022. 5 pages with English translation.
Written Opinion of the International Search Authority in the international application No. PCT/CN2022/079019, mailed on Jun. 1, 2022. 7 pages with English translation.
Vattikuti Naresh et al: "Delay sensitive TDMA slot assignment in ad hoc wireless networks", 2015 Twenty First National Conference On Communications (NCC), IEEE, Feb. 27, 2015 (Feb. 27, 2015), pp. 1-5, XP032763730, DOI: 10.1109/NCC.2015.7084878, the whole document.
Supplementary European Search Report in the European application No. 22762591.0, mailed on Jul. 8, 2024. 10 pages.

* cited by examiner

A node device determines a delay within the node device from a certain slot at a input port to another slot at a port, where the node device is a node device on an end-to-end channel — 301

The node device determines that the delay is used for establishing slot allocation on the end-to-end channel — 302

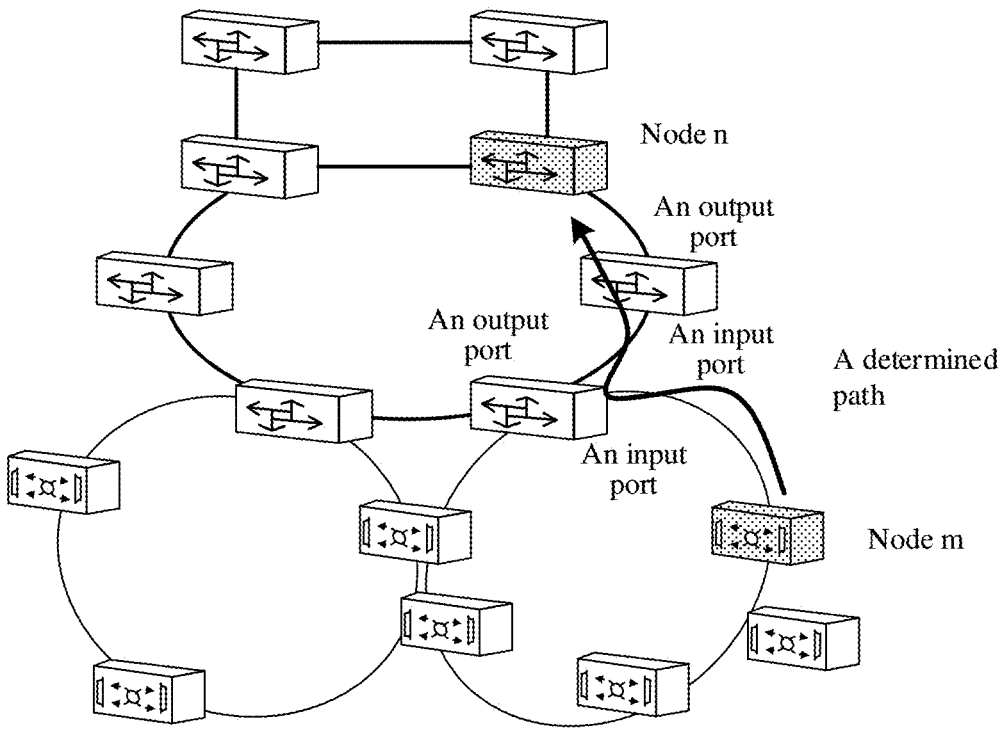

FIG. 4

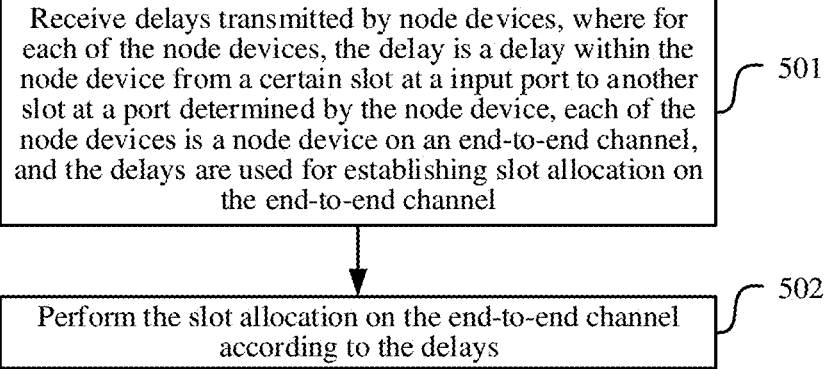

Receive delays transmitted by node devices, where for each of the node devices, the delay is a delay within the node device from a certain slot at a input port to another slot at a port determined by the node device, each of the node devices is a node device on an end-to-end channel, and the delays are used for establishing slot allocation on the end-to-end channel    501

Perform the slot allocation on the end-to-end channel according to the delays    502

FIG. 5

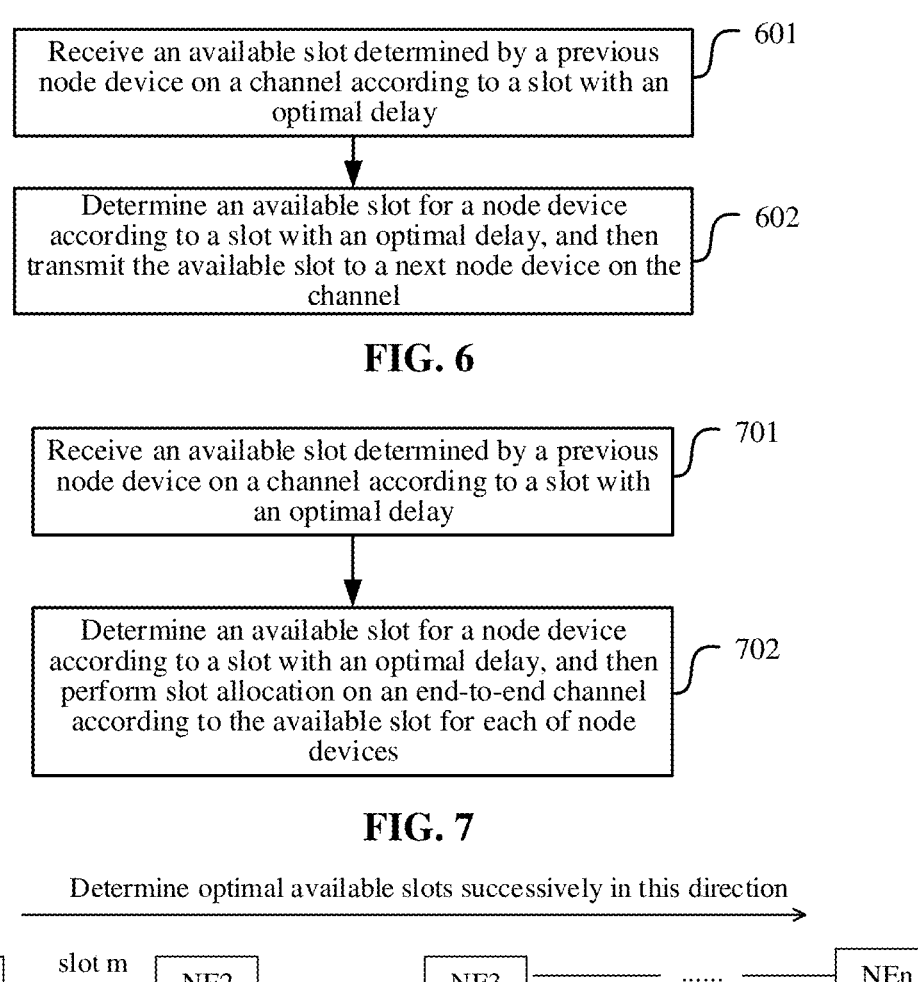

601

Receive an available slot determined by a previous node device on a channel according to a slot with an optimal delay

602

Determine an available slot for a node device according to a slot with an optimal delay, and then transmit the available slot to a next node device on the channel

Receive an available slot determined by a previous node device on a channel according to a slot with an optimal delay

702

Determine an available slot for a node device according to a slot with an optimal delay, and then perform slot allocation on an end-to-end channel according to the available slot for each of node devices

FIG. 7

Determine optimal available slots successively in this direction

| NE1 | slot m | NE2 | ———— | NE3 | ———— ...... ———— | NEn |

Determine an optimal slot n

Determine an optimal slot q at an output port based on an optimal slot n at an input port

FIG. 8

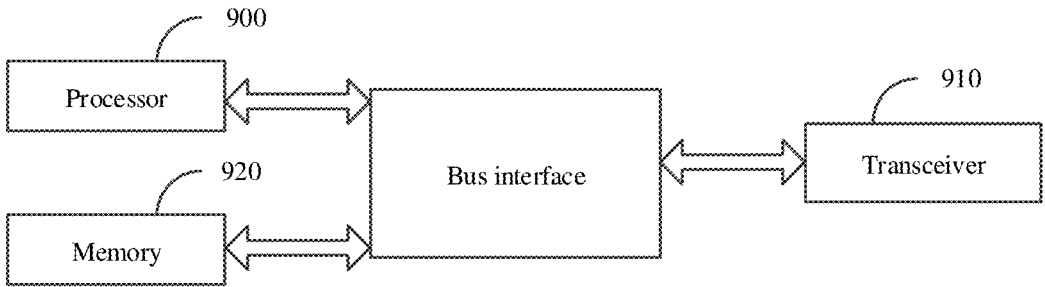

900

Processor

910

Transceiver

920

Bus interface

Memory

FIG. 9

TIME SLOT ALLOCATION PROCESSING METHOD, DEVICE AND STORAGE MEDIUM

CROSS-REFERENCE TO RELATED APPLICATIONS

This application is a U.S. National Stage of International Application No. PCT/CN2022/079019 filed on Mar. 3, 2022, which claims priority to Chinese Patent application No. 202110235233.X filed on Mar. 3, 2021. The disclosures of the above-referenced applications are hereby incorporated by reference in their entirety.

TECHNICAL FIELD

The disclosure relates to the technical field of communications, and in particular to a method for processing slot allocation, a device and a storage medium.

BACKGROUND

With the development of 5G and the increase of users in vertical industries, the demand for slicing in the network has increased. A lot of beneficial exploration in the slicing isolation technology based on Ethernet has been made in the industry. For example, the flex Ethernet (FlexE) technology dominated by Optical Internet Forum (OIF) provides a fragmentation mechanism based on the Ethernet physical interface, which may provide an effective interface-level isolation mechanism. However, FlexE is just an interface-level technology at present, which cannot meet the networking requirements of operators networks. Metro transport network (MTN) is a new transmission network technology system defined by ITU-Telecommunication standardization sector (ITU-T) for new service requirements such as 5G, which may realize the effective integration of time division multiplexing (TDM) and packet switching. MTN is composed of a section layer and a path layer. A MTN section layer supports slot division and port binding, and is compatible with Ethernet underlying protocol stack and standard Ethernet optical module. A path layer of metro transmission network supports TDM switching based on 66B code blocks, has a comprehensive end-to-end operation administration and maintenance (OAM) mechanism, and supports cross-multiplexing of channelized customer signals with any Nx5G or smaller bandwidth particles.

The deficiency of the related art is that the current method for establishing an end-to-end slicing channel will increase a processing delay within a node due to the method for slot allocation.

SUMMARY

The disclosure provides a method for processing slot allocation, a device and a storage medium to solve the problem of an increasing processing delay within a node due to the method for slot allocation.

The disclosure provides the following technical solutions.

A method for processing slot allocation, including the following operations.

A node device determines a delay within the node device from a certain slot at an input port to another slot at a port, where the node device is a node device on an end-to-end channel.

The node device determines that the delay is used for establishing slot allocation on the end-to-end channel.

In some optional embodiments, the operation that the node device determines the delay for establishing the slot allocation on the end-to-end channel may include the following operations.

The node device transmits the delay to a centralized system; and/or the node device determines an available slot for the node device according to a slot with an optimal delay, and then transmits the available slot for the node device to a next node device on the channel.

In some optional embodiments, the delay determined by the node device may be determined by the node device by itself; and/or the delay determined by the node device may be determined upon reception of a request for determining the delay.

In some optional embodiments, the request for determining the delay may be transmitted by a centralized system to node devices on a node device path after determining the node device path that the end-to-end channel passes through.

In some optional embodiments, the delay within the node device from the certain slot at the input port to the another slot at the port determined by the node device may be a delay value between other slots determined by the node device after the node device determines a delay within the node device from a certain slot A at an input port p to another slot B at an output port q.

In some optional embodiments, the delay value between other slots may be determined based on a frame structure with slots and a pre-acquired node delay variation model.

In some optional embodiments, the method may further include the following operations.

An available slot determined by a previous node device on the channel according to a slot with an optimal delay for the previous node device is received.

An available slot for the node device is determined according to a slot with an optimal delay for the node device, and then the available slot for the node device is transmitted to the next node device on the channel.

A method for processing slot allocation, includes the following operations.

An available slot determined by a previous node device on a channel according to a slot with an optimal delay for the previous node device is received.

An available slot for a current node device is determined according to a slot with an optimal delay for the current node device, and then the available slot for the current node device is transmitted to a next node device on the channel.

Where determining delays of available slots comprises: for each of node devices, determining, by the node device, the delay within the node device from a certain slot at an input port to another slot at a port, wherein each of the node devices is a node device on an end-to-end channel, and the delays are used for establishing slot allocation on the end-to-end channel.

In some optional embodiments, the delay determined by the node device may be determined by the node device by itself; and/or the delay determined by the node device may be determined upon reception of a request for determining the delay.

In some optional embodiments, the request for determining the delay may be transmitted by a centralized system to the node devices on a node device path after determining the node device path that the end-to-end channel passes through.

In some optional embodiments, the delay within the node device from the certain slot at the input port to the another slot at the port determined by the node device may be a delay value between other slots determined by the node device after the node device determines a delay within a node from a certain slot A at an input port p to another slot B at an output port q.

In some optional embodiments, the delay value between other slots may be determined based on a frame structure with slots and a pre-acquired node delay variation model.

A method for processing slot allocation, includes the following operations.

An available slot determined by a previous node device on a channel according to a slot with an optimal delay for the previous node device is received.

An available slot for a current node device is determined according to a slot with an optimal delay for the current node device, and then slot allocation is performed on an end-to-end channel according to respective available slots for node devices.

Where determining delays of available slots comprises: for each of the node devices, determining, by the node device, the delay within the node device from a certain slot at an input port to another slot at a port, each of the node devices is a node device on the end-to-end channel, and the delays are used for establishing the slot allocation on the end-to-end channel.

In some optional embodiments, the delay determined by the node device may be determined by the node device by itself; and/or the delay determined by the node device may be determined upon reception of a request for determining the delay.

In some optional embodiments, the request for determining the delay may be transmitted by a centralized system to the node devices on a node device path after determining the node device path that the end-to-end channel passes through.

In some optional embodiments, the delay within the node device from the certain slot at the input port to the another slot at the port determined by the node device may be a delay value between other slots determined by the node device after the node device determines a delay within a node from a certain slot A at an input port p to another slot B at an output port q.

In some optional embodiments, the delay value between other slots may be determined based on a frame structure with slots and a pre-acquired node delay variation model.

A method for processing slot allocation, includes the following operations.

Delays transmitted by node devices are received, where for each of the node devices, the delay is a delay within the node device from a certain slot at an input port to another slot at a port determined by the node device, each of the node devices is a node device on an end-to-end channel, and the delays are used for establishing slot allocation on the end-to-end channel.

The slot allocation is performed on the end-to-end channel according to the delays.

In some optional embodiments, the delay determined by the node device may be determined by the node device by itself; and/or the delay determined by the node device may be determined upon reception of a request for determining the delay.

In some optional embodiments, the method may further include the following operations.

A node device path that the end-to-end channel passes through is determined, and then the request for determining the delays is transmitted to the node devices on the node device path.

In some optional embodiments, the operation that the slot allocation on the end-to-end channel is performed according to the delays may include the following operations.

A slot with an optimal delay within each node device is determined as an available slot for the node device successively in a direction from a source node device to a destination node device, and the slot allocation is performed according to the determined available slots.

A node device, including a processor and a transceiver.

The processor is configured to read a program in a memory to perform the following operations.

A delay within the node device from a certain slot at an input port to another slot at a port is determined, where the node device is a node device on an end-to-end channel.

It is determined that the delay is used for establishing slot allocation on the end-to-end channel.

The transceiver is configured to receive and transmit data under the control of the processor.

In some optional embodiments, the operation of determining that the delay is used for establishing slot allocation on the end-to-end channel may include the following operations.

The delay is transmitted to a centralized system; and/or an available slot for the node device is determined according to a slot with an optimal delay, and then the available slot is transmitted to a next node device on the channel.

In some optional embodiments, the determined delay may be determined by the node device by itself; and/or the determined delay may be determined upon reception of a request for determining the delay.

In some optional embodiments, the request for determining the delay may be transmitted by a centralized system to node devices on a node device path after determining the node device path that the end-to-end channel passes through.

In some optional embodiments, the determined delay within the node device from the certain slot at the input port to the another slot at the port may be a delay value between other slots determined by the node device after the node device determines a delay within the node device from a certain slot A at an input port p to another slot B at an output port q.

In some optional embodiments, the delay value between other slots may be determined based on a frame structure with slots and a pre-acquired node delay variation model.

In some optional embodiments, the method may further include the following operations.

An available slot determined by a previous node device on the channel according to a slot with an optimal delay for the previous node device is received.

An available slot for the node device is determined according to the slot with the optimal delay for the node device, and then the available slot for the node device is transmitted to the next node device on the channel.

A node device, includes a first determination module and a first transmission module.

The first determination module is configured to determine a delay within the node device from a certain slot at an input port to another slot at a port, where the node device is a node device on an end-to-end channel.

The first transmission module is configured to determine that the delay is used for establishing slot allocation on the end-to-end channel.

In some optional embodiments, the first transmission module may be further configured to transmit the delay to a centralized system; and/or determine an available slot for the node device according to a slot with an optimal delay, and then transmit the available slot for the node device to a next node device on the channel.

In some optional embodiments, the first determination module may be further configured to determine the delay by itself; and/or, determine the delay upon reception of a request for determining the delay.

In some optional embodiments, the first transmission module may be further configured to transmit the request for determining the delay by a centralized system to node devices on a node device path after determining the node device path that the end-to-end channel passes through.

In some optional embodiments, in determining the delay within the node device from the certain slot at the input port to the another slot at the port, the first determination module may be further configured to determine a delay value between other slots after determining a delay within the node device from a certain slot A at an input port p to another slot B at an output port q.

In some optional embodiments, the first determination module may be further configured to determine the delay value between other slots based on a frame structure with slots and a pre-acquired node delay variation model.

In some optional embodiments, the first transmission module may be further configured to receive an available slot determined by a previous node device on the channel according to a slot with an optimal delay for the previous node device, determine an available slot for the node device according to a slot with an optimal delay for the node device, and then transmit the available slot for the node device to a next node device on the channel.

A node device, includes a processor and a transceiver.

The processor is configured to read a program in a memory to perform the following operations.

An available slot determined by a previous node device on a channel according to a slot with an optimal delay for the previous node device is received.

An available slot for a current node device is determined according to a slot with an optimal delay for the current node device, and then the available slot for the current node device is transmitted to a next node device on the channel.

Where determining delays of available slots comprises: for each of node devices, determining, by the node device, the delay within the node device from a certain slot at an input port to another slot at a port, wherein each of the node devices is a node device on an end-to-end channel, and the delays are used for establishing slot allocation on the end-to-end channel.

The transceiver is configured to receive and transmit data under control of the processor.

In some optional embodiments, the determined delay may be determined by the node device by itself; and/or the determined delay may be determined upon reception of a request for determining the delay.

In some optional embodiments, the request for determining the delay may be transmitted by a centralized system to the node devices on a node device path after determining the node device path that the end-to-end channel passes through.

In some optional embodiments, the determined delay within the node device from the certain slot at the input port to the another slot at the port may be a determined delay value between other slots after the node device determines a delay within a node from a certain slot A at an input port p to another slot B at an output port q.

In some optional embodiments, the delay value between other slots may be determined based on a frame structure with slots and a pre-acquired node delay variation model.

A node device, includes a first reception module and a second transmission module.

The first reception module is configured to receive an available slot determined by a previous node device on a channel according to a slot with an optimal delay for the previous node device.

The second transmission module is configured to determine an available slot for a current node device according to a slot with an optimal delay for the current node device, and then transmit the available slot for the current node device to a next node device on the channel.

Where determining delays of available slots comprises: for each of node devices, determining, by the node device, the delay within the node device from a certain slot at an input port to another slot at a port, wherein each of the node devices is a node device on an end-to-end channel, and the delays are used for establishing slot allocation on the end-to-end channel.

In some optional embodiments, the second transmission module may be further configured to determine the delay by itself; and/or determine the delay upon reception of a request for determining the delay.

In some optional embodiments, the second transmission module may be further configured to transmit the request for determining the delay by a centralized system to the node devices on a node device path after determining the node device path that the end-to-end channel passes through.

In some optional embodiments, in determining the delay within the node device from the certain slot at the input port to the another slot at the port, the second transmission module may be further configured to determine a delay value between other slots after the node device determines a delay within the node device from a certain slot A at an input port p to another slot B at an output port q.

In some optional embodiments, the second transmission module may be further configured to determine the delay value between other slots based on a frame structure with slots and a pre-acquired node delay variation model.

A node device, including a processor and a transceiver.

The processor is configured to read a program in a memory to perform the following operations.

An available slot determined by a previous node device on a channel according to a slot with an optimal delay for the previous node device is received.

An available slot for a current node device is determined according to a slot with an optimal delay for the current node device, and then slot allocation is performed on an end-to-end channel according to respective available slots for node devices.

Where determining delays of available slots comprises: for each of the node devices, determining, by the node device, the delay within the node device from a certain slot at an input port to another slot at a port, each of the node devices is a node device on the end-to-end channel, and the delays are used for establishing the slot allocation on the end-to-end channel.

The transceiver is configured to receive and transmit data under control of the processor.

In some optional embodiments, the determined delay may be determined by the node device by itself; and/or the determined delay may be determined upon reception of a request for determining the delay.

In some optional embodiments, the request for determining the delay may be transmitted by a centralized system to the node devices on a node device path after determining the node device path that the end-to-end channel passes through.

In some optional embodiments, the determined delay within the node device from the certain slot at the input port to the another slot at the port may be a determined delay value between other slots after the node device determines a delay within a node from a certain slot A at an input port p to another slot B at an output port q.

In some optional embodiments, the delay value between other slots may be determined based on a frame structure with slots and a pre-acquired node delay variation model.

A node device, includes a second reception module and a first allocation module.

The second reception module is configured to receive an available slot determined by a previous node device on a channel according to a slot with an optimal delay for the previous node device.

The first allocation module is configured to determine an available slot for a current node device according to a slot with an optimal delay for the current node device, and then perform slot allocation on an end-to-end channel according to respective available slots for node devices.

Where determining delays of available slots comprises: for each of node devices, determining, by the node device, the delay within the node device from a certain slot at an input port to another slot at a port, wherein each of the node devices is a node device on an end-to-end channel, and the delays are used for establishing slot allocation on the end-to-end channel.

In some optional embodiments, the first allocation module may be further configured to determine the delay by itself; and/or determine the delay after receiving a request for determining the delay.

In some optional embodiments, the first allocation module may be further configured to transmit the request for determining the delay by a centralized system to the node devices on a node device path after determining the node device path that the end-to-end channel passes through.

In some optional embodiments, in determining the delay within the node device from the certain slot at the input port to the another slot at the port, the first allocation module may be further configured to determine a delay value between other slots after the node device determines a delay within the node device from a certain slot A at an input port p to another slot B at an output port q.

In some optional embodiments, the first allocation module may be further configured to determine the delay value between other slots based on a frame structure with slots and a pre-acquired node delay variation model.

A centralized system, includes a processor and a transceiver.

The processor is configured to read a program in a memory to perform the following operations.

Delays transmitted by node devices are received, where for each of the node devices, the delay is a delay within the node device from a certain slot at an input port to another slot at a port determined by the node device, each of the node devices is a node device on an end-to-end channel, and the delays are used for establishing slot allocation on the end-to-end channel.

The slot allocation on the end-to-end channel is performed according to the delays.

The transceiver is configured to receive and transmit data under control of the processor.

In some optional embodiments, the determined delay may be determined by the node device by itself; and/or the determined delay may be determined upon reception of a request for determining the delay.

In some optional embodiments, the method may further include the following operations.

A node device path that the end-to-end channel passes through is determined, and then the request for determining the delay is transmitted to the node devices on the node device path.

In some optional embodiments, the operation of performing the slot allocation on the end-to-end channel according to the delays may include the following operations.

A slot with an optimal delay within each node device is determined as an available slot for the node device successively in a direction from a source node device to a destination node device, and the slot allocation is performed according to the determined available slots.

A centralized system, including a third reception module and a second allocation module.

The third reception module is configured to receive delays transmitted by node devices, wherein for each of the node devices, the delay is a delay within the node device from a certain slot at an input port to another slot at a port determined by the node device, each of the node devices is a node device on an end-to-end channel, and the delays are used for establishing slot allocation on the end-to-end channel.

The second allocation module is configured to perform slot allocation on the end-to-end channel according to the delays.

In some optional embodiments, the third reception module may be further configured to receive the delay determined by the node device by itself; and/or receive the determined delay upon reception of a request for determining the delay.

In some optional embodiments, the third reception module may be further configured to determine a node device path that the end-to-end channel passes through, and then transmit the request for determining the delay to the node devices on the node device path.

In some optional embodiments, in performing the slot allocation on the end-to-end channel according to the delays, the second allocation module may be further configured to determine a slot with an optimal delay within each node device as an available slot for the node device successively in a direction from a source node device to a destination node device, and perform the slot allocation according to the determined available slots.

A computer-readable storage medium, having stored thereon a computer program, the computer program executes the above methods for processing slot allocation.

The disclosure has the following beneficial effects.

In the technical solutions provided in the embodiments of the disclosure, the node device determines the delay within the node device from a certain slot at an input port to another slot at a port. Due to considering the delay information as an input condition for establishing the slot allocation on the end-to-end channel when performing the slot allocation, the delay caused by the slot allocation on one channel is reduced, and the delay on the end-to-end channel is reduced.

BRIEF DESCRIPTION OF THE DRAWINGS

The drawings illustrated herein are intended to provide a further understanding of the disclosure and constitute a part of the disclosure. The illustrative embodiments of the disclosure and the description thereof are used to explain the disclosure and do not constitute an improper limitation of the disclosure.

FIG. 4 is a schematic diagram of a channel path establishment in the embodiment of the disclosure.

FIG. 5 is a schematic diagram of an implementation flow of a method for processing slot allocation on a centralized system in the embodiment of the disclosure.

FIG. 6 is a schematic diagram of an implementation flow of a method for processing slot allocation on an intermediate node device side in the embodiment of the disclosure.

FIG. 7 is a schematic diagram of an implementation flow of a method for processing slot allocation on a destination node device side in the embodiment of the disclosure.

FIG. 8 is a schematic diagram of a process of successively determining optimal slots in the embodiment of the disclosure.

FIG. 9 is a schematic diagram of a first structure of a node device in the embodiment of the disclosure.

DETAILED DESCRIPTION

The inventor noticed the following situations during the invention process.

Figure 1:
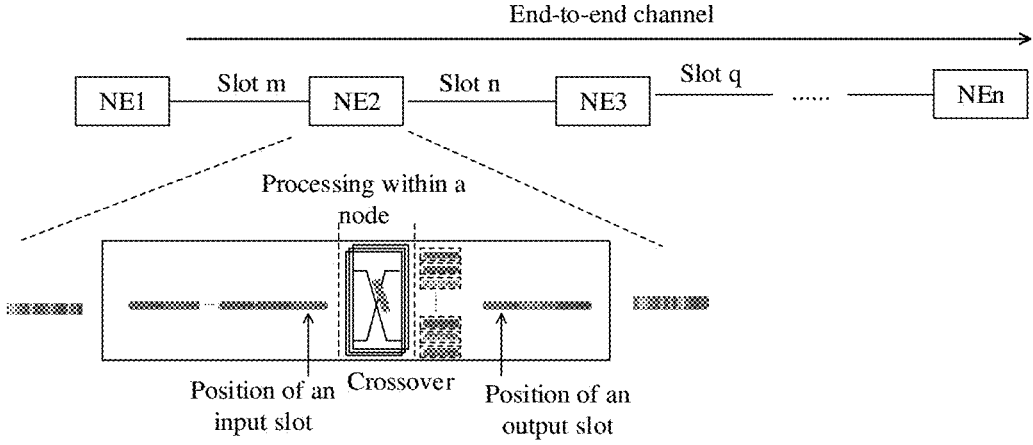
FIG. 1 is a schematic diagram of slot allocation on an end-to-end channel in the embodiment of the disclosure.

In order to establish an end-to-end channel, for example, from a source node NE1 to a destination node NEn, a port slot is configured for each node, as shown in the following drawings. For example, if the end-to-end channel needs a bandwidth of 10 million bits per second (Mbps), and the minimum bandwidth granularity for each slot is a 10 Mbps bandwidth, 1 slot needs to be configured for each node. FIG. 1 is a schematic diagram of slot allocation on an end-to-end channel. As shown in FIG. 1, an output port configured for NE1 uses a m-th slot (slot m), an output port configured for NE2 uses a n-th slot (slot n), and an output port configured for NE3 uses the q-th slot (slot q). When the slots for all nodes on the end-to-end channel are allocated, the end-to-end slot channel can be established.

In the related art, the slot allocation is completed once. The slot allocation for each node in a channel mainly considers availability, and a required number of slots may be allocated from available slot resources for each node port.

Figure 2:
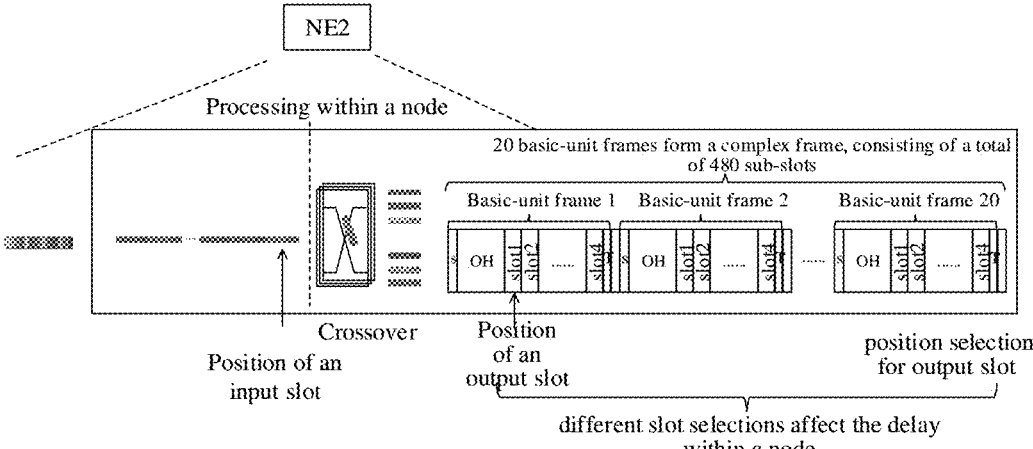
FIG. 2 is a schematic diagram of an impact of slot selection on a node delay in the embodiment of the disclosure.

However, with the decrease of slot bandwidth, the processing delay within the node increases accordingly. Node processing delay has become a factor that has to be paid attention to. How to reduce the processing delay? There is a significant factor in the delay, which is related to slot allocation. FIG. 2 is a schematic diagram of an impact of slot selection on a node delay. For example, as shown in FIG. 2, assuming that a slot structure of a 10 million (M) slice granularity for a slicing packet network (SPN) is adopted, there are 480 slots to choose in a calendar slot of 5G. Choosing a first slot or a last slot or other slot in the 480 slots has a significant impact on the node delay. Assuming that a certain input slot channel needs to be sent out after completing a crossover within the node, and it happens to match the first slot in the 480 slots, and the selected output slot is also the first slot, then the delay is the shortest. Assuming that the first slot of the 480 slots is matched to the sending out, but the selected output slot is the last slot of the 480 slots, it has to wait until the last slot comes, to fill and transmit, in this case, the delay is relatively long.

Based on this, the embodiment of the disclosure proposes a new scheme for establishing slot allocation on the end-to-end channel, which can optimize the delay caused by the slot allocation in a channel and meet the technical and application requirements.

Specific implementation of the disclosure is described below with reference to the drawings.

In the description, the implementation of a source node device side, an intermediate node device side, a destination node device side and a centralized system (e.g., a management and control system) side involved in the end-to-end channel will be explained respectively, and then embodiments of their cooperation will be provided to better understand the implementation of the scheme provided in the embodiment of the disclosure. This explanation does not mean that they must be implemented together or separately. In fact, when they are implemented separately, they also solve their own problems, and when they are used together, they will get better technical results.

In the embodiments of the disclosure, two schemes are provided for the slot allocation, one is implemented by the centralized system, and the other is implemented by each node device. The embodiment of the node device for determining and transmitting the delay will be explained in FIG. 3, the scheme performed by the centralized system will be explained in FIG. 5, and the allocation scheme performed by each node device will be explained in FIG. 6 (the intermediate node device) and FIG. 7 (the destination node device).

Figure 3:
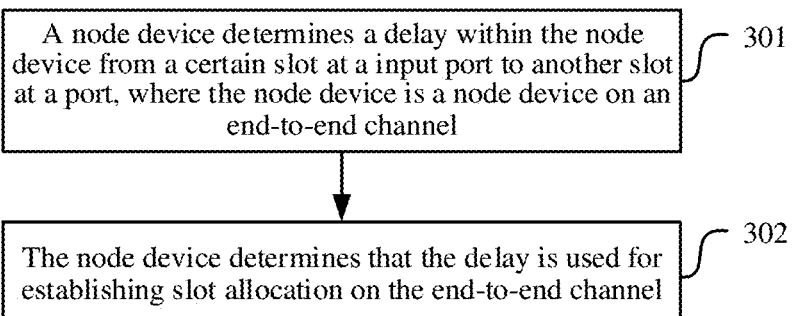
FIG. 3 is a schematic diagram of an implementation flow of a method for processing slot allocation in the embodiment of the disclosure.

FIG. 3 is a schematic diagram of an implementation flow of a method for processing slot allocation, as shown in FIG. 3, the method may include the following operations 301 to 302.

At 301, a node device determines a delay within the node device from a certain slot at an input port to another slot at a port, where the node device is a node device on an end-to-end channel.

At 302, the node device determines that the delay is used for establishing slot allocation on the end-to-end channel.

In some optional embodiments, the operation that the node device determines that the delay is used for establishing slot allocation on the end-to-end channel includes the following operations.

The node device transmits the delay to a centralized system; and/or the node device determines an available slot for the node device according to a slot with an optimal delay, and then transmits the available slot for the node device to a next node device on the channel.

In some optional embodiments, the node device determines the delay within the node device from the certain slot at the input port to the another slot at the port and takes the delay information as an input condition for establishing the slot allocation on the end-to-end channel.

Specifically, in implementation, when the node device detects a specific mark of a certain slot at an input port, the node device records a time stamp. When detecting a mark of a certain slot at an output port, the node device records another time stamp. By performing a subtracting operation on the two time stamp values, the delay from the slot at the input port to another slot at the output port may be obtained.

In some optional embodiments, the delay determined by the node device is determined by the node device by itself; and/or the delay determined by the node device is determined upon reception of a request for determining the delay.

Specifically, the node device determines the delay by itself, or the node device determines the delay upon reception of the request.

The node device may determine the delay within the node from a certain slot at an input port to another slot at a port (for example, when the device is started) by itself, or the node device starts to determine the delay within the node device from a certain slot at an input port of the node to another slot at the port upon receiving a request.

In some optional embodiments, the request for determining the delay is transmitted by a centralized system to node devices on a node device path after determining the node device path that the end-to-end channel passes through.

Specifically, after the centralized system determines the channel path, the centralized system requests the delay within each of the nodes between corresponding ports of the respective node on the determined path, from the slot at the input port to the slot at the output port of the respective node.

FIG. 4 is a schematic diagram of a channel path establishment. As shown in FIG. 4, the request may be received as follows: after a centralized system (e.g., a management and control system) determines to establish an end-to-end channel with a certain bandwidth from a node m to another node n, the centralized system calculates and determines a path from the node m to the node n based on network information (such as network topology, available slot resources of nodes, etc.), including information of intermediate nodes, an input port and an output port of each node, and then the centralized system requests the delay within each of the nodes between corresponding ports of the respective node on the determined path, from the slot at the input port to the slot at the output port.

The delay within the node device from the certain slot at the input port to the another slot at the port determined by the node device is a delay value between other slots determined by the node device after the node device determines a delay within the node device from a certain slot A at an input port p to another slot B at an output port q.

In some optional embodiments, the delay value between other slots is determined based on a frame structure with slots and a pre-acquired node delay variation model.

Specifically, after the node device determines the delay within the node device from the certain slot A at the input port p to the another slot B at the output port q, the delay value between other slots is calculated based on the frame structure with slots and the pre-acquired node delay variation model.

After the node device determines the delay within the node device from the certain slot A at the input port p to the another slot B at the output port q, the delay within the node devices from another slot (e.g., slot C) at the port p to another slot (e.g., slot D) at the port q does not need to be tested and determined one by one. It may be calculated according to the delay value from the slot A at the input port p to the slot B at the output port q, the frame structure with slots and the pre-acquired node delay variation model.

Explanations will be given in the below respectively.

1. The slot allocation is performed by a centralized system.

FIG. 5 is a schematic diagram of an implementation flow of a method for processing slot allocation on a centralized system. As shown in FIG. 5, the method may include the following operations 501 to 502.

At 501, delays transmitted by node devices are received, where for each of the node devices, the delay is a delay within the node device from a certain slot at an input port to another slot at a port determined by the node device, each of the node devices is a node device on an end-to-end channel, and the delays are used for establishing slot allocation on the end-to-end channel.

At 502, the slot allocation on the end-to-end channel is performed according to the delays.

In some optional embodiments, the delay determined by the node device is determined by the node device by itself; and/or the delay determined by the node device is determined upon reception of a request for determining the delay.

In some optional embodiments, the method may further include the following operations.

A node device path that the end-to-end channel passes through is determined, and then the request for determining the delay is transmitted to the node device on the node device path.

In some optional embodiments, the operation that the slot allocation on the end-to-end channel is performed according to each delay includes the following operations.

A slot with an optimal delay within each node device is determined as an available slot for the node device successively in a direction from a source node device to a destination node device, and the slot allocation is performed according to the determined available slots.

The optimal delay is not necessarily the minimum delay, and the minimum delay is merely one of the cases, and there may be other strategies. In the allocation of available slots with the optimal delay for each node, the optimal delay may be the slot with the smallest delay or the slot with the second smallest delay considering a tolerance for certain jitter. Assuming that the slot with the smallest delay jitters and a phase changes being a bit earlier, the output may not be able to catch up with this slot, so it has to wait for one cycle and then put it into the same slot in the next cycle, and in this case, the delay will become relatively large.

Specifically, the node device determines a delay within a node from a certain slot A at a input port p to an another slot B at a port q, and then the node device reports the delay to the centralized system. After the centralized system obtains all delay information on the path, it determines an available slot allocation with the optimal delay for each node successively in a direction from a source node to a destination node. After determining the slots, the centralized system performs slot allocation based on the determined slots and establishes a channel.

2. The slot allocation is performed by each node device.

In the case of no centralized system or no need for a centralized system, the slot allocation may be determined by each node, and then transmitted to the next node through a message, so as to successively determine an available slot allocation with an optimal delay for each node.

FIG. 6 is a schematic diagram of an implementation flow of a method for processing slot allocation on an intermediate node device side. As shown in FIG. 6, the method may include the following operations 601 to 602.

At 601, an available slot determined by a previous node device on a channel according to a slot with an optimal delay for the previous node device is received.

At 602, an available slot for a current node device is determined according to a slot with an optimal delay for the current node device, and then the available slot for the current node device is transmitted to a next node device on the channel.

Determining delays of available slots includes determining, by each of node devices, the delay within the node device from a certain slot at an input port to another slot at a port, each of the node devices is a node device on an end-to-end channel, and the delays are used establishing the slot allocation on the end-to-end channel.

FIG. 7 is a schematic diagram of an implementation flow of a method for processing slot allocation on a destination node device side. As shown in FIG. 7, the method may include the following operations 701 to 702.

At 701, an available slot determined by a previous node device on a channel according to a slot with an optimal delay for the previous node device is received.

At 702, an available slot for a current node device is determined according to a slot with the optimal delay for the current node device, and then slot allocation on an end-to-end channel is performed according to respective available slots for node devices.

Determining delays of available slots includes determining, by each of node devices, the delay within the node device from a certain slot at an input port to another slot at a port, each of the node devices is a node device on the end-to-end channel, and the delays are used establishing the slot allocation on the end-to-end channel.

FIG. 8 is a schematic diagram of a process of successively determining optimal slots. As shown in FIG. 8, in the above slot allocation process and the allocation of available slots with an optimal delay for each node, the optimal delay may be the slot with the smallest delay or the slot with the second smallest delay considering a tolerance for certain jitter. Assuming that the slot with the smallest delay jitters and a phase changes is a bit earlier, the output may not be able to catch up with this slot, so it has to wait for one cycle and then put it into the same slot in next cycle, and in this case, the delay will become relatively large.

For bidirectional channels, the above process may be independently performed in both directions to determine the adopted slots respectively.

Based on the same inventive concept, the embodiment of the disclosure further provides a node device, a centralized system, and a computer-readable storage medium. Since a principle of solving the problem by these devices is similar to the method for processing slot allocation on the node device and the centralized system, the implementation of these devices may refer to the implementation of the method, and the repetition will not be repeated.

When implementing the technical solution provided by the embodiment of the disclosure, it may be implemented in the following manner.

FIG. 9 is a schematic diagram of a first structure of a node device. As shown in FIG. 9, the node device includes a processor, a memory and a transceiver.

A processor 900 is configured to read a program in a memory 920 to perform the following operations.

A delay within the node device from a certain slot at an input port to another slot at a port is determined, where the node device is a node device on an end-to-end channel.

It is determined that the delay is used for establishing slot allocation on the end-to-end channel.

A transceiver 910 is configured to receive and transmit data under the control of the processor 900.

In some optional embodiments, the operation of determining that the delay is used for establishing slot allocation on the end-to-end channel includes the following operations.

The delay is transmitted to a centralized system; and/or an available slot for the node device is determined according to a slot with an optimal delay, and then the available slot is transmitted to a next node device on the channel.

In some optional embodiments, the determined delay is determined by the node device by itself; and/or the determined delay is determined upon reception of a request for determining the delay.

In some optional embodiments, the request for determining the delay is transmitted by a centralized system to node devices on a node device path after determining the node device path that the end-to-end channel passes through.

In some optional embodiments, the determined delay within the node device from the certain slot at the input port to the another slot at the port may be a delay value between other slots determined by the node device after the node device determines a delay within the node device from a certain slot A at an input port p to another slot B at an output port q.

In some optional embodiments, the delay value between other slots is determined based on a frame structure with slots and a pre-acquired node delay variation model.

In some optional embodiments, the method further includes the following operations.

An available slot determined by a previous node device on the channel according to a slot with an optimal delay for the previous node device is received.

An available slot for the node device is determined according to the slot with the optimal delay for the node device, and then the available slot for the node device is transmitted to the next node device on the channel.

In FIG. 9, a bus architecture may include any number of interconnected buses and bridges, specifically one or more processors represented by the processor 900 and various circuits of memories represented by the memory 920 linked together. The bus architecture may also link various other circuits such as peripheral devices, regulators, and power management circuits together, which are well known in the art. Therefore, these content will not be further described herein. A bus interface provides interfaces. The transceiver 910 may be multiple components, including a transmitter and a receiver, providing a unit for communicating with various other devices on a transmission medium. The processor 900 is responsible for managing the bus architecture and general processing. The memory 920 may store data used by the processor 900 when performing operations.

The embodiment of the disclosure further provides a node device, including a first determination module and a first transmission module.

The first determination module is configured to determine a delay within the node device from a certain slot at an input port to another slot at a port, where the node device is a node device on an end-to-end channel.

The first transmission module is configured to determine that the delay is used for establishing slot allocation on the end-to-end channel.

In some optional embodiments, the first transmission module is further configured to transmit the delay to a centralized system; and/or determine an available slot for the node device according to a slot with an optimal delay, and then transmit the available slot for the node device to a next node device on the channel.

In some optional embodiments, the first determination module is further configured to determine the delay by itself; and/or, determine the delay upon reception of a request for determining the delay.

In some optional embodiments, the first transmission module is further configured to transmit the request for determining the delay by a centralized system to node devices on a node device path after determining the node device path that the end-to-end channel passes through.

In some optional embodiments, in determining the delay within the node device from the certain slot at the input port to the another slot at the port, the first determination module may be further configured to determine a delay value between other slots after determining a delay within the node device from a certain slot A at an input port p to another slot B at an output port q.

In some optional embodiments, the first determination module is further configured to determine the delay value between other slots based on a frame structure with slots and a pre-acquired node delay variation model.

In some optional embodiments, the first transmission module may be further configured to receive an available slot determined by a previous node device on the channel according to a slot with an optimal delay for the previous node device, determine an available slot for the node device according to a slot with an optimal delay for the node device, and then transmit the available slot for the node device to a next node device on the channel.

For the convenience of description, each part of the above device is divided into various modules or units according to their functions and described respectively. Of course, the functions of each module or unit may be implemented in the same or multiple software or hardware when implementing the disclosure.

Figure 10:
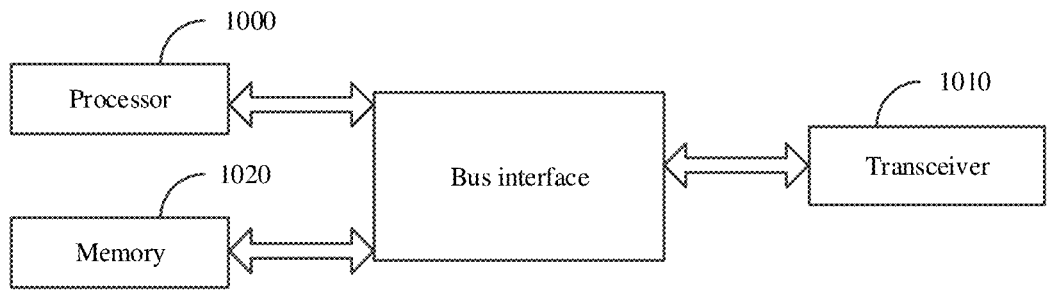
FIG. 10 is a schematic diagram of a second structure of a node device in the embodiment of the disclosure.

FIG. 10 is a schematic diagram of a second structure of a node device. As shown in FIG. 10, the node device includes a processor, a memory and a transceiver.

A processor 1000 is configured to read a program in a memory 1020 to perform the following operations.

An available slot determined by a previous node device on a channel according to a slot with an optimal delay for the previous node device is received.

An available slot for a current node device is determined according to a slot with an optimal delay for the current node device, and then the available slot for the current node device is transmitted to a next node device on the channel.

Where determining delays of available slots comprises: for each of node devices, determining, by the node device, the delay within the node device from a certain slot at an input port to another slot at a port, wherein each of the node devices is a node device on an end-to-end channel, and the delays are used for establishing slot allocation on the end-to-end channel.

A transceiver 1010 is configured to receive and transmit data under the control of the processor 1000.

In some optional embodiments, the determined delay is determined by the node device by itself; and/or the determined delay is determined upon reception of a request for determining the delay.

In some optional embodiments, the request for determining the delay is transmitted by a centralized system to the node devices on a node device path after determining the node device path that the end-to-end channel passes through.

In some optional embodiments, the determined delay within the node device from the certain slot at the input port to the another slot at the port is a determined delay value between other slots after the node device determines a delay within a node from a certain slot A at an input port p to another slot B at an output port q.

In some optional embodiments, the delay value between other slots is determined based on a frame structure with slots and a pre-acquired node delay variation model.

In FIG. 10, a bus architecture may include any number of interconnected buses and bridges, specifically one or more processors represented by the processor 1000 and various circuits of memories represented by the memory 1020 linked together. The bus architecture may also link various other circuits such as peripheral devices, regulators, and power management circuits together, which are well known in the art. Therefore, these content will not be further described herein. A bus interface provides interfaces. The transceiver 1010 may be multiple components, including a transmitter and a receiver, providing a unit for communicating with various other devices on a transmission medium. The processor 1000 is responsible for managing the bus architecture and general processing. The memory 1020 may store data used by the processor 1000 when performing operations.

The embodiment of the disclosure further provides a node device, including a first reception module and a second transmission module.

The first reception module is configured to receive an available slot determined by a previous node device on a channel according to a slot with an optimal delay for the previous node device.

The second transmission module is configured to determine an available slot for a current node device according to a slot with an optimal delay for the current node device, and then transmit the available slot for the current node device to a next node device on the channel.

Where determining delays of available slots comprises: for each of node devices, determining, by the node device, the delay within the node device from a certain slot at an input port to another slot at a port, wherein each of the node devices is a node device on an end-to-end channel, and the delays are used for establishing slot allocation on the end-to-end channel.

In some optional embodiments, the second transmission module is further configured to determine the delay by itself; and/or determine the delay upon reception of a request for determining the delay.

In some optional embodiments, the second transmission module is further configured to transmit the request for determining the delay by a centralized system to the node devices on a node device path after determining the node device path that the end-to-end channel passes through.

In some optional embodiments, in determining the delay within the node device from the certain slot at the input port to the another slot at the port, the second transmission module may be further configured to determine a delay value between other slots after the node device determines a delay within the node device from a certain slot A at an input port p to another slot B at an output port q.

In some optional embodiments, the second transmission module is further configured to determine the delay value between other slots based on a frame structure with slots and a pre-acquired node delay variation model.

For the convenience of description, each part of the above device is divided into various modules or units according to their functions and described respectively. Of course, the functions of each module or unit may be implemented in the same or multiple software or hardware when implementing the disclosure.

Figure 11:
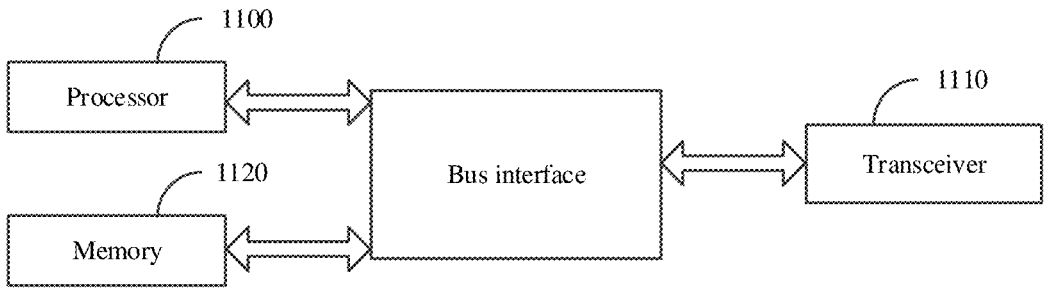
FIG. 11 is a schematic diagram of a third structure of a node device in the embodiment of the disclosure.

FIG. 11 is a schematic diagram of a third structure of a node device. As shown in FIG. 11, the node device includes a processor, a memory and a transceiver.

A processor 1100 is configured to read a program in a memory 1120 to perform the following operations.

An available slot determined by a previous node device on a channel according to a slot with an optimal delay for the previous node device is received.

An available slot for a current node device is determined according to a slot with an optimal delay for the current node device, and then slot allocation is performed on an end-to-end channel according to respective available slots for node devices.

Where determining delays of available slots comprises: for each of the node devices, determining, by the node device, the delay within the node device from a certain slot at an input port to another slot at a port, each of the node devices is a node device on the end-to-end channel, and the delays are used for establishing the slot allocation on the end-to-end channel.

A transceiver 1110 is configured to receive and transmit data under the control of the processor 1100.

In some optional embodiments, the determined delay is determined by the node device by itself; and/or the determined delay is determined upon reception of a request for determining the delay.

In some optional embodiments, the request for determining the delay is transmitted by a centralized system to the node devices on a node device path after determining the node device path that the end-to-end channel passes through.

In some optional embodiments, the determined delay within the node device from the certain slot at the input port to the another slot at the port is a determined delay value between other slots after the node device determines a delay within a node from a certain slot A at an input port p to another slot B at an output port q.

In some optional embodiments, the delay value between other slots is determined based on a frame structure with slots and a pre-acquired node delay variation model to determine the delay value between other slots.

In FIG. 11, a bus architecture may include any number of interconnected buses and bridges, specifically one or more processors represented by the processor 1100 and various circuits of memories represented by the memory 1120 linked together. The bus architecture may also link various other circuits such as peripheral devices, regulators, and power management circuits together, which are well known in the art. Therefore, these content will not be further described herein. A bus interface provides interfaces. The transceiver 1110 may be multiple components, including a transmitter and a receiver, providing a unit for communicating with various other devices on a transmission medium. The processor 1100 is responsible for managing the bus architecture and general processing. The memory 1120 may store data used by the processor 1100 when performing operations.

The embodiment of the disclosure further provides a node device, including a second reception module and a first allocation module.

The second reception module is configured to receive an available slot determined by a previous node device on a channel according to a slot with an optimal delay for the previous node device.

The first allocation module is configured to determine an available slot for a current node device according to a slot with an optimal delay for the current node device, and then perform slot allocation on an end-to-end channel according to respective available slots for node devices.

Determining delays of available slots comprises: for each of node devices, determining, by the node device, the delay within the node device from a certain slot at an input port to another slot at a port, wherein each of the node devices is a node device on an end-to-end channel, and the delays are used for establishing slot allocation on the end-to-end channel.

In some optional embodiments, the first allocation module is further configured to determine the delay by itself; and/or determine the delay after receiving a request for determining the delay.

In some optional embodiments, the first allocation module is further configured to transmit the request for determining the delay by a centralized system to the node devices on a node device path after determining the node device path that the end-to-end channel passes through.

In some optional embodiments, in determining the delay within the node device from the certain slot at the input port to the another slot at the port, the first allocation module may be further configured to determine a delay value between other slots after the node device determines a delay within the node device from a certain slot A at an input port p to another slot B at an output port q.

In some optional embodiments, the first allocation module is further configured to determine the delay value between other slots based on the frame structure with slots and the pre-acquired node delay variation model.

For the convenience of description, each part of the above device is divided into various modules or units according to their functions and described respectively. Of course, the functions of each module or unit may be implemented in the same or multiple software or hardware when implementing the disclosure.

Figure 12:
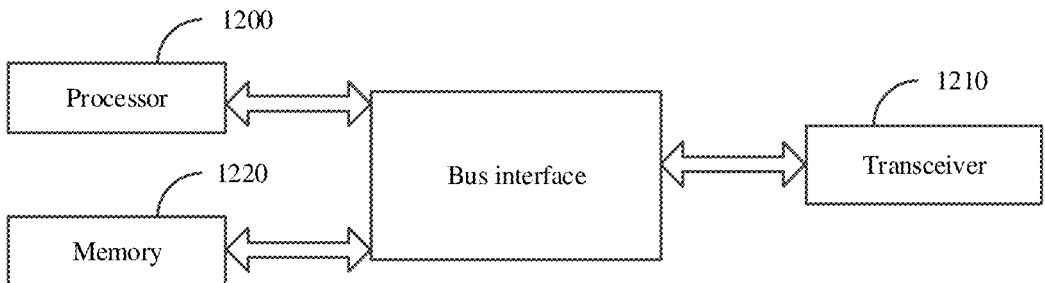
FIG. 12 is a schematic structural diagram of a centralized system in the embodiment of the disclosure.

FIG. 12 is a schematic structural diagram of a centralized system. As shown in FIG. 12, the centralized system includes a processor, a memory and a transceiver.

A processor 1200 is configured to read a program in a memory 1220 to perform the following operations.

Delays transmitted by node devices are received, where for each of the node devices, the delay is a delay within the node device from a certain slot at an input port to another slot at a port determined by the node device, each of the node devices is a node device on an end-to-end channel, and the delays are used for establishing slot allocation on the end-to-end channel.

The slot allocation on the end-to-end channel is performed according to each delays.

A transceiver 1210 is configured to receive and transmit data under the control of the processor 1200.

In some optional embodiments, the determined delay is determined by the node device by itself; and/or the determined delay is determined upon reception of a request for determining the delay.

In some optional embodiments, the method further includes the following operations.

A node device path that the end-to-end channel passes through is determined, and then the request for determining the delay is transmitted to the node device on the node device path.

In some optional embodiments, the operation of performing the slot allocation on the end-to-end channel according to the delay includes the following operations.

A slot with an optimal delay within each node device is determined as an available slot for the node device successively in a direction from a source node device to a destination node device in sequence, and the slot allocation is performed according to the determined available slots.

In FIG. 12, a bus architecture may include any number of interconnected buses and bridges, specifically one or more processors represented by the processor 1200 and various circuits of memories represented by the memory 1220 linked together. The bus architecture may also link various other circuits such as peripheral devices, regulators, and power management circuits together, which are well known in the art. Therefore, these content will not be further described herein. A bus interface provides interfaces. The transceiver 1210 may be multiple components, including a transmitter and a receiver, providing a unit for communicating with various other devices on a transmission medium. The processor 1200 is responsible for managing the bus architecture and general processing. The memory 1220 may store data used by the processor 1200 when performing operations.

The embodiment of the disclosure further provides a centralized system, including a third reception module and a second allocation module.

The third reception module is configured to receive delays transmitted by node devices, wherein for each of the node devices, the delay is a delay within the node device from a certain slot at an input port to another slot at a port determined by the node device, each of the node devices is a node device on an end-to-end channel, and the delays are used for establishing slot allocation on the end-to-end channel.

The second allocation module is configured to perform slot allocation on the end-to-end channel according to the delays.

In some optional embodiments, the third reception module is further configured to receive the delay determined by the node device by itself; and/or receive the determined delay upon reception of a request for determining the delay.

In some optional embodiments, the third reception module is further configured to determine a node device path that the end-to-end channel passes through, and then transmit the request for determining the delay to the node device on the node device path.

In some optional embodiments, in performing the slot allocation on the end-to-end channel according to the delays, the second allocation module may be further configured to determine a slot with an optimal delay within each node device as an available slot for the node device successively in a direction from a source node device to a destination node device, and perform the slot allocation according to the determined available slots.

For the convenience of description, each part of the above device is divided into various modules or units according to their functions and described respectively. Of course, the functions of each module or unit may be implemented in the same or multiple software or hardware when implementing the disclosure.

The embodiment of the disclosure further provides a computer-readable storage medium, having stored thereon a computer program, the computer program executes the above methods for processing slot allocation.

For specific implementation, please refer to the implementation of methods for processing slot allocation for a node device, an intermediate node device, a destination node device, a centralized system, or their combinations.

In summary, in the technical solution provided by the embodiment of the disclosure, a node device determines a delay within the node device from a certain slot at an input port to another slot at a port, and takes the delay information as an condition for establishing slot allocation on an end-to-end channel. Specifically, the technical solution further provides the following operations.

The node device determines the delay by itself, or the node device determines the delay after receiving a request.

A centralized system determines a channel path, and then requests the delay within each of the nodes between corresponding ports of the respective node on the determined path, from the slot at the input port to the slot at the output port of the respective node.

The centralized system obtains all delay information on the path, and determines available slot allocation with an optimal delay within each node device successively in a direction from a source node to a destination node. After determining the slots, the centralized system performs slot allocation based on the determined slots and establishes a channel.

The slot allocation may also be determined by each node, and then transmitted to the next node through a message, so as to successively determine an available slot allocation with the optimal delay within each node device.

For bidirectional channels, the above process is performed independently in two directions, and slots adopted are determined respectively.

The node device determines a delay within the node device from a certain slot A at an input port p to another slot B at an output port q, and then calculates the delay value between other slots based on a frame structure with slots and a pre-acquired node delay variation model The scheme proposes a set of schemes of effective end-to-end channel establishment, including slot allocation, which can optimize the delay caused by the slot allocation on a channel and reduce the delay on the end-to-end channel.

It may be understood by those skilled in the art that the embodiment of the disclosure may be provided as methods, systems or computer program products. Therefore, the disclosure may take the form of embodiments with entirely hardware, embodiments with entirely software, or embodiments combining software and hardware aspects. Furthermore, the disclosure may take the form of a computer program product implemented on one or more computer available storage media (including, but not limited to, disk storages, optical storages, etc.) containing computer available program code therein.

The disclosure is described with reference to flowcharts and/or block diagrams of methods, devices (systems) and computer program products according to the embodiment of the disclosure. It should be understood that computer program instructions may implement each process and/or block in the flowcharts and/or the block diagrams, as well as combinations of process and/or block in the flowcharts and/or the block diagrams. These computer program instructions may be provided to processors of general purpose computers, specialized computers, embedded processors or other programmable data processing devices to generate a machine such that instructions executed by the processors of the computers or other programmable data processing devices implement the functions specified in one or more flows of the flowcharts and/or one or more blocks of the block diagrams.

These computer program instructions may also be stored in a computer-readable memory that may guide a computer or other programmable data processing device to operate in a specific manner such that the instructions stored in the computer-readable memory generate a manufacture including instruction devices, and the instruction devices implement functions specified in one or more flows of the flowcharts and/or one or more blocks of the block diagrams.

These computer program instructions may also be loaded onto a computer or other programmable data processing device such that a series of operations are executed on the computer or other programmable device to generate computer-implemented processing, and the instructions executed on the computer or other programmable device provide operations for implementing functions specified in one or more flows of the flowcharts and/or one or more blocks of the block diagrams.

It is apparent that those skilled in the art may make various modifications and variations to the disclosure without departing from the spirit and scope of the disclosure. In this way, if these modifications and variations of the disclosure fall within the scope of the claims and their equivalents of the disclosure, the disclosure also intends to include these modifications and variations.

The invention claimed is:

1. A method for processing slot allocation, comprising:

determining, by a node device, a delay within the node device from a certain slot at an input port to another slot at a port, wherein the node device is a node device on an end-to-end channel; and determining, by the node device, that the delay is used for establishing slot allocation on the end-to-end channel;

wherein the delay within the node device from the certain slot at the input port to the another slot at the port determined by the node device is a delay value between other slots determined by the node device after the node device determines a delay within the node device from a certain slot A at an input port p to another slot B at an output port q; and the delay value between other slots is determined based on a frame structure with slots and a pre-acquired node delay variation model.

2. The method of claim 1, wherein determining, by the node device, the delay for establishing the slot allocation on the end-to-end channel, comprises at least one of the following:

transmitting, by the node device, the delay to a centralized system; or determining, by the node device, an available slot for the node device according to a slot with an optimal delay, and then transmitting, by the node device, the available slot for the node device to a next node device on the end-to-end channel.

3. The method of claim 1, wherein the delay is determined by the node device by itself; and/or the delay is determined by the node device upon reception of a request for determining the delay.

4. The method of claim 3, wherein the request for determining the delay is transmitted by a centralized system to node devices on a node device path after determining the node device path that the end-to-end channel passes through.

5. The method of claim 1, further comprising:

receiving an available slot determined by a previous node device on the end-to-end channel according to a slot with an optimal delay for the previous node device; and determining an available slot for the node device according to a slot with an optimal delay for the node device, and then transmitting the available slot for the node device to a next node device on the end-to-end channel.

6. A method for processing slot allocation, comprising:

receiving an available slot determined by a previous node device on an end-to-end channel according to a slot with an optimal delay for the previous node device; and determining an available slot for a current node device according to a slot with an optimal delay for the current node device, and then transmitting the available slot for the current node device to a next node device on the end-to-end channel;

wherein determining delays of available slots comprises:

for each of node devices on the end-to-end channel, determining, by the node device, the delay within the node device from a certain slot at an input port to another slot at a port, wherein each of the node devices is a node device on an end-to-end channel, and the delays are used for establishing slot allocation on the end-to-end channel;

wherein the delay within the node device from the certain slot at the input port to the another slot at the port determined by the node device is a delay value between other slots determined by the node device after the node device determines a delay within a node from a certain slot A at an input port p to another slot B at an output port q; and the delay value between other slots is determined based on a frame structure with slots and a pre-acquired node delay variation model.

7. The method of claim 6, wherein the delay is determined by the node device by itself; and/or the delay is determined by the node device upon reception of a request for determining the delay.

8. The method of claim 7, wherein the request for determining the delays is transmitted by a centralized system to the node devices on a node device path after determining the node device path that the end-to-end channel passes through.

9. A node device, comprising:

a processor, configured to read a program in a memory to:

determine a delay within the node device from a certain slot at an input port to another slot at a port, wherein the node device is a node device on an end-to-end channel; and determine that the delay is used for establishing slot allocation on the end-to-end channel; and a transceiver, configured to receive and transmit data under control of the processor;

wherein the delay within the node device from the certain slot at the input port to the another slot at the port determined by the node device is a delay value between other slots determined by the node device after the node device determines a delay within the node device from a certain slot A at an input port p to another slot B at an output port q; and the delay value between other slots is determined based on a frame structure with slots and a pre-acquired node delay variation model.

10. A node device comprising:

a processor, configured to read a program in a memory to perform the method of claim 6; and a transceiver, configured to receive and transmit data under control of the processor.

11. The node device of claim 9, wherein in determining the delay for establishing the slot allocation on the end-to-end channel, the transceiver is configured to perform at least one of the following operations:

transmitting the delay to a centralized system; or determining an available slot for the node device according to a slot with an optimal delay, and then transmitting the available slot for the node device to a next node device on the end-to-end channel.

12. The node device of claim 9, wherein the delay is determined by the node device by itself; and/or the delay is determined by the node device upon reception of a request for determining the delay.

13. The node device of claim 12, wherein the request for determining the delay is transmitted by a centralized system to node devices on a node device path after determining the node device path that the end-to-end channel passes through.

14. The node device of claim 9, wherein the transceiver is further configured to perform the following operations:

receiving an available slot determined by a previous node device on the end-to-end channel according to a slot with an optimal delay for the previous node device; and determining an available slot for the node device according to a slot with an optimal delay for the node device, and then transmitting the available slot for the node device to a next node device on the end-to-end channel.

15. The node device of claim 10, wherein the delay is determined by the node device by itself; and/or the delay is determined by the node device upon reception of a request for determining the delay.

16. The node device of claim 15, wherein the request for determining the delays is transmitted by a centralized system to the node devices on a node device path after determining the node device path that the end-to-end channel passes through.

\* \* \* \* \*